Dec. 27, 1966 G. A. SCHMIDT ET AL 3,294,452
WHEEL COVER
Filed Sept. 3, 1964 2 Sheets-Sheet 2
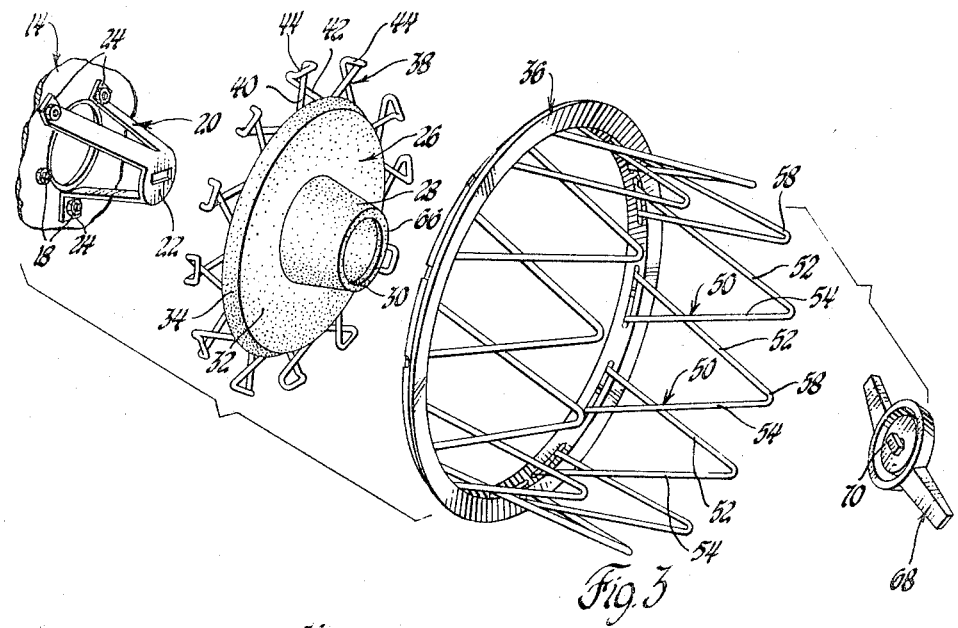
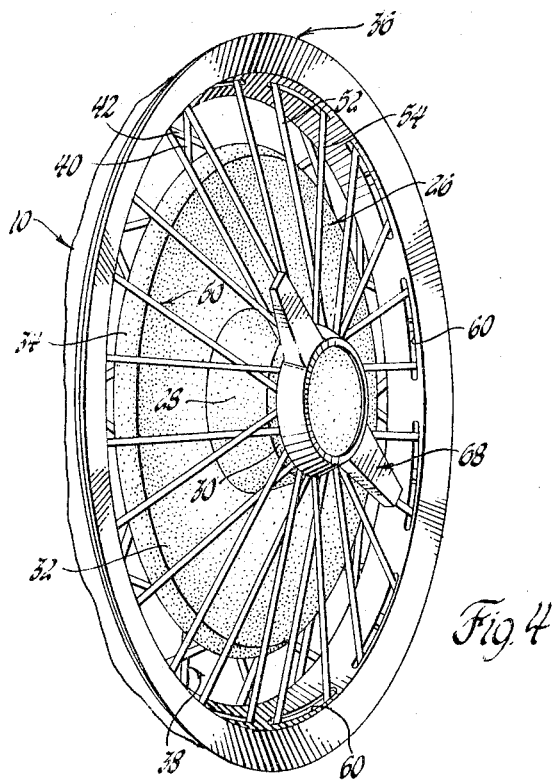
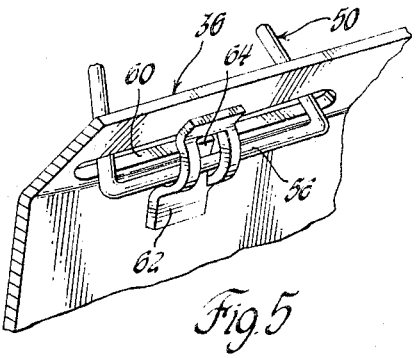
INVENTORS
George A. Schmidt
BY Albert J. Gonas
*Herbert Furman*
ATTORNEY 3,294,452
WHEEL COVER
George A. Schmidt, Southfield, and Albert J. Gonas, Grosse Pointe, Mich., assignors to General Motors Corporation, Detroit, Mich., a corporation of Delaware
Filed Sept. 3, 1964, Ser. No. 394,222
7 Claims. (Cl. 301—37)

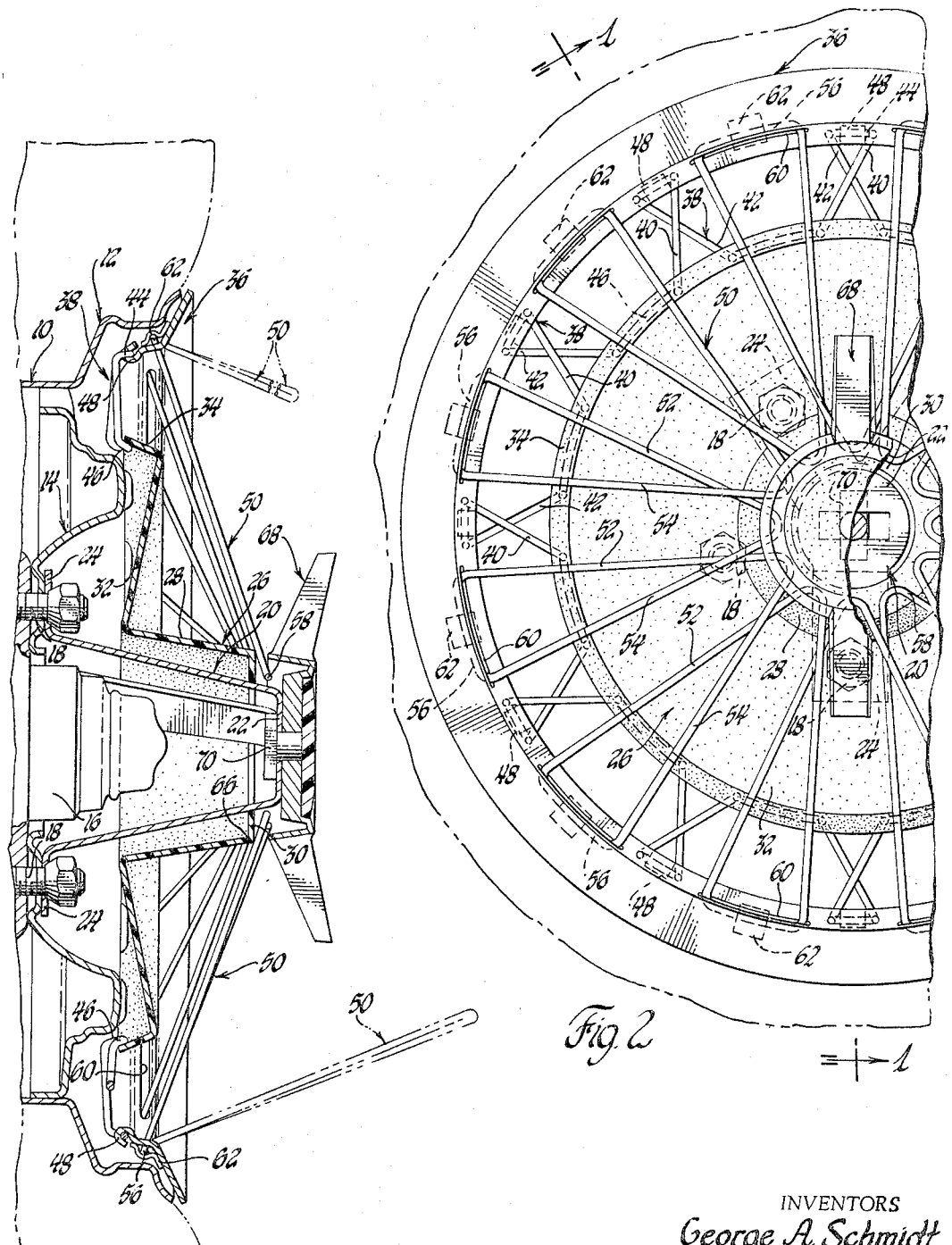

This invention relates to wheel covers and more particularly to a wire wheel cover assembly.

One feature of this invention is that it provides an improved wire wheel cover assembly including a plurality of spokes which may be moved axially outwardly of the cover to obtain access to an axially inwardly disposed cover member for cleaning purposes. Another feature of this invention is that the spokes are hinged to the cover assembly at their radially outer ends for movement axially outwardly of the cover. A further feature of this invention is that the spokes are formed from a single piece of wire and have their inner ends adapted to be releasably secured to a central portion of the inwardly disposed cover member. Yet another feature of this invention is that the spokes are formed of axially inwardly and axially outwardly disposed rows of members arranged in overlapping relationship to each other, with each row being integrally secured to the other row at both the axially inner and outer ends of the members, wtih the axially outer ends of the members providing hinge mounting means for each row and the axially inner ends of the members providing releasable securing means. Yet a further feature of this invention is that it provides an improved wheel cover assembly including a centrally disposed cover member joined to a radially outwardly disposed trim ring member by an intermediate row of radially outwardly extending spokes, with the trim ring member and cover member being further interconnected by an annular row of spokes, each of which is hinged to one of the members and releasably secured to the other members for movement axially outward of both members to obtain access to each for cleaning purposes.

These and other features of the wire wheel cover assembly of this invention will be readily apparent from the following specification and drawings wherein:

FIGURE 1 is a sectional view of a vehicle wheel having a wire wheel cover assembly according to this invention mounted thereon;

FIGURE 2 is a partially broken away view of the cover assembly;

FIGURE 3 is an exploded perspective view;

FIGURE 4 is a perspective view of the cover assembly; and

FIGURE 5 is an enlarged perspective view of a portion of FIGURE 1.

Referring now particularly to FIGURE 1 of the drawings, a vehicle wheel designated generally 10 includes a wheel rim 12 and a wheel body or spider 14 which is secured to the axle assembly 16 of the vehicle by a number of bolts 18. The spider 14 is also secured to the rim 12 at a number of places and both the wheel 10 and the axle are conventional and form no part of this invention.

A cover mounting member 20 includes a slotted body portion 22 provided with three axially inwardly and radially outwardly extending legs, each of which terminates in a laterally extending apertured flange 24 which is adapted to be secured to the wheel body 14 by the bolts 18 to mount the member 20 on the wheel. An inner cover member 26, which may be conveniently formed of plastic, includes a central dome or crown portion 28 having an apertured base wall 30 and receiving the body portion 22 and portions of the legs of the member 20 therethrough, as shown in FIGURE 1. The member 26 further includes an annular radially and outwardly extending portion 32 terminating in a radially outwardly and axially inwardly extending flange 34. It can be seen that the member 26 covers substantially the entire area of the body 14 of the wheel 10 as well as conceals the member 20 from view when received thereover.

A trim ring member 36 is located in radially outwardly spaced relationship to the member 26 and partially conceals the rim 12 from view from the exterior of the wheel. An annular row of spokes 38 extends between the axially inner edge of the member 36 and the flange 34 of the member 26 and interconnects these members. The spokes 38 are formed from a single length of wire and each includes cross members 40 and 42 which are interconnected at the radially outer ends thereof by a laterally extending loop portion 44. The radially inner end of each member 40 is connected by a laterally extending loop portion 46 to the radially inner end of the next succeeding member 42. The axially inner edge portion of the trim ring 36 includes return bent tabs or tangs 48 which secure the loop portions 44 to the trim ring member 36 and the loop portions 46 of each of the spokes hook under the flange 34 of the member 26.

The members 26 and 36 are further interconnected by an annular row of spokes 50 which are located axially outwardly of the spokes 38. The spokes 50 are formed from a single length of wire and each spoke includes an axially inwardly disposed spoke member 52 and an axially outwardly disposed spoke member 54 which crosses the member 52 adjacent the radially inner ends thereof. The spoke members 52 and 54 of each spoke 50 are interconnected by a circumferentially extending loop portion 56 at the radially outer ends thereof while the radially inner end of each member 52 is connected by a loop portion 58 to the radially inner end of the member 54 of the next succeeding spoke.

The member 36 is provided with a spaced series of circumferential slots 60 which permit each of the spokes 50 to project radially inwardly from the trim ring member 36 toward the crown portion 28 of the cover member 26. The loop portions 58 of the spokes 50 are hingedly secured to the inner surface of the trim ring member 36 by clips 62, FIGURE 5, which have their ends welded or otherwise secured to the offset flanges of the trim ring member and include an intermediate offset tab 64 which resiliently engages a loop portion 56 to hold this loop portion within a generally U-shaped portion of the clip. The openings 60 are large enough to permit swinging movement between the spokes 50 and the trim ring member 36.

The loop portions 58 of the spokes 50 bear against a shoulder 66 of the member 26 and are clamped thereagainst by a knock-off type hub 68 having a generally T-shaped lug 70 adapted to be received within the slotted body portion 22 of the member 20 and thereafter rotated relative thereto to clamp the spokes 50 between the hub 68 and the shoulder 66 of the member 26.

Whenever it is desired to disassemble the cover assembly, the hub 68 is first removed and thereafter the cover assembly can be removed from the wheel. If it is desired to obtain access to the member 26 or to the spokes 38 from the outside of the wheel for cleaning purposes or otherwise, one of the loop portions 58 of one of the spokes is manually grasped and is moved axially outwardly of the wheel. This will cause the spokes 50 which include the one loop portion to swing radially outwardly of the wheel and in turn cause all of the other spokes 50 to also swing radially outwardly of the wheel about their radially outer ends thereof and the hinged connection provided between these ends and the trim ring member 36 by the clips 62. When the spokes 50 have been swung radially outwardly of the wheel, they will be located as shown in FIGURE 3.

When it is desired to return the spokes 50 to their normal or operative relationship to the member 26, any one of the loop portions 58 is manually grasped and is moved axially inwardly of the wheel into engagement with the shoulder 66 of the member 26, and simultaneously with this movement of the one spoke, the other spokes will also move to their normal position.

Thus, this invention provides an improved wire wheel cover assembly.

We claim:

1. A wheel cover assembly comprising, in combination, an annular cover member adapted to be located in covering relationship to a portion of a vehicle wheel, and a wire ring assembly including an annular row of generally radially disposed spokes, means swingably mounting a radial end of each of said spokes on said member for movement axially outwardly of said cover member, and means interconnecting said spokes for simultaneous axially and radially outward movement thereof about their swingably mounted ends.

2. A wheel cover assembly as recited in claim 1 wherein said spokes are provided by a plurality of rows of spoke members, the spoke members of one row overlapping the spoke members of the other row, swinging movement of the members of said one row axially outwardly of the cover member moving all said spoke members axially outwardly as a unit.

3. A wheel cover assembly as recited in claim 2 wherein said spoke members are formed from a continuous wire member.

4. A wheel cover assembly comprising, in combination, a pair of radially spaced annular cover members, a first annular row of spokes interconnecting said cover members, a second annular row of radially disposed spokes, means swingably mounting a radial end of each of said spokes to one of said cover members, and means releasably securing the other radial end of said spokes to the other of said cover members, said second annular row of spokes being swingable radially and axially of said one cover member about their swingably mounted ends from a first position overlying said first annular row of spokes to a second generally axially extending position permitting access to said first annular row of spokes.

5. The combination recited in claim 4 wherein said one cover member comprises a radially outer disposed trim ring and said other cover member comprises a radially inner disposed member, said second row of spokes overlying a portion of said trim ring and a major portion of said other cover member.

6. The combination recited in claim 4 wherein said releasable securing means include means for mounting said other cover member on a vehicle wheel.

7. A wheel cover assembly comprising, in combination, an outer cover member, an inner cover member spaced from said outer cover member, a first annular row of spokes interconnecting said cover members, a second annular row of spokes, means hingedly securing a radially disposed end of each of said spokes to said outer cover member, said hingedly securing means permitting swinging movement of said second annular row of spokes radially and axially of said outer cover member from a first position overlying said first annular row of spokes to a second generally axially extending position permitting access to said first annular row of spokes, means for mounting said inner cover member on a portion of the vehicle wheel, and means removably securing said inner cover member to said mounting means and removably securing the radial disposed other end of each of said second annular row of spokes to said inner cover member.

References Cited by the Examiner

UNITED STATES PATENTS

| | | | |
|---|---|---|---|
| 2,493,366 | 1/1950 | Simcich | 301—108 |
| 2,835,535 | 5/1958 | Wood | 301—37 |
| 2,899,240 | 8/1959 | Mulhern | 301—37 |
| 3,174,803 | 3/1965 | Mulhern et al. | 301—37 |

FOREIGN PATENTS 1,090,144  10/1954  France.

MILTON BUCHLER, *Primary Examiner.*
BENJAMIN HERSH, *Examiner.*
R. J. JOHNSON, *Assistant Examiner.*